United States Patent
Vinson et al.

(10) Patent No.: US 8,904,419 B2
(45) Date of Patent: Dec. 2, 2014

(54) SYSTEM AND METHOD FOR MEASURING TELEVISION AUDIENCE ENGAGEMENT

(71) Applicant: Rentrak Corporation, Portland, OR (US)

(72) Inventors: Michael Vinson, Piedmont, CA (US); Bruce Goerlich, Forest Hills, NY (US); Maria Loper, Portland, OR (US); Melissa Martin, Portland, OR (US); Amir Yazdani, Portland, OR (US)

(73) Assignee: Rentrak Corporation, Portland, OR (US)

( * ) Notice: Subject to any disclaimer, the term of this patent is extended or adjusted under 35 U.S.C. 154(b) by 0 days.

(21) Appl. No.: 13/847,476

(22) Filed: Mar. 19, 2013

(65) Prior Publication Data

US 2013/0247081 A1    Sep. 19, 2013

Related U.S. Application Data

(60) Provisional application No. 61/612,837, filed on Mar. 19, 2012.

(51) Int. Cl.
*H04H 60/32* (2008.01)
*H04N 21/442* (2011.01)
*H04N 21/254* (2011.01)
*H04N 21/658* (2011.01)

(52) U.S. Cl.
CPC ... *H04N 21/44204* (2013.01); *H04N 21/44222* (2013.01); *H04N 21/254* (2013.01); *H04N 21/6582* (2013.01)
USPC .......................................................... 725/14

(58) Field of Classification Search
None
See application file for complete search history.

(56) References Cited

U.S. PATENT DOCUMENTS

| | | | |
|---|---|---|---|
| 4,264,925 A | 4/1981 | Freeman et al. | |
| 4,355,372 A | 10/1982 | Johnson et al. | |
| 4,603,232 A | 7/1986 | Kurland et al. | |
| 5,023,929 A | 6/1991 | Call | |
| 5,675,510 A | 10/1997 | Coffey et al. | |
| 6,070,145 A | 5/2000 | Pinsley et al. | |
| 6,098,048 A | 8/2000 | Dashefsky et al. | |
| 6,115,680 A | 9/2000 | Coffee et al. | |
| 7,039,928 B2 | 5/2006 | Kamada et al. | |
| 7,260,823 B2* | 8/2007 | Schlack et al. | 725/9 |
| 7,739,140 B2* | 6/2010 | Vinson et al. | 705/7.32 |
| 7,954,120 B2 | 5/2011 | Roberts et al. | |
| 2003/0115585 A1* | 6/2003 | Barsness et al. | 725/9 |
| 2006/0075421 A1 | 4/2006 | Roberts et al. | |
| 2007/0199013 A1 | 8/2007 | Samari et al. | |
| 2008/0148309 A1 | 6/2008 | Wilcox et al. | |
| 2009/0234649 A1 | 9/2009 | Goodhew | |
| 2010/0318406 A1 | 12/2010 | Zazza et al. | |

(Continued)

*Primary Examiner* — Chris Parry
(74) *Attorney, Agent, or Firm* — Perkins Coie LLP (57) ABSTRACT

A system and method are disclosed that measures audience engagement with a program based on the time a user spends viewing the program. A program's ability to retain viewers is referred to as the "stickiness" of the program. The viewership for a program is determined by the system and then compared to viewership of various other programs in order to assess the audience retention for the analyzed program as compared to the retention of the other programs. The system calculates a "stickiness index" for the program, which is a numerical representation of the analyzed program's stickiness as compared to the average of the other programs. The system may generate a report including the analyzed data and calculated stickiness index for advertisers, agencies, media sellers, or other parties that are interested in assessing viewership of the analyzed program.

18 Claims, 8 Drawing Sheets

(56) References Cited

U.S. PATENT DOCUMENTS

| | | |
|---|---|---|
| 2010/0319018 A1 | 12/2010 | Zazza |
| 2010/0319019 A1 | 12/2010 | Zazza |
| 2012/0078682 A1 | 3/2012 | Pinsley et al. |
| 2012/0260280 A1 | 10/2012 | Harsh et al. |
| 2012/0278828 A1 | 11/2012 | Yazdani et al. |
| 2012/0304211 A1* | 11/2012 | Berezowski et al. ........... 725/14 |

* cited by examiner

SYSTEM AND METHOD FOR MEASURING TELEVISION AUDIENCE ENGAGEMENT

CROSS-REFERENCE TO RELATED APPLICATION(S)

This application claims the benefit of U.S. Provisional Patent Application No. 61/612,837, entitled "SYSTEM AND METHOD FOR MEASURING TELEVISION AUDIENCE ENGAGEMENT (STICKINESS INDEX)," filed Mar. 19, 2012, which is incorporated herein by reference in its entirety.

BACKGROUND

An advertisement presented to a member of a target audience draws various levels of engagement by each audience member. For example, audience members may not even be aware of an advertisement considered to have a "low engagement level." In such cases, the audience members only mindlessly or passively observes the advertisement, such that the audience member may not even be able to recollect the advertisement though it was viewed by that audience member. Conversely, for advertisements considered to have a "high engagement level," the advertisement captures the direct and undivided attention of an audience member. Subsequently, that audience member may actively pursue a course of action suggested by that advertisement or purchase a product or service that is the subject of that advertisement.

Recent advances in marketing communications technology have created a new sense of awareness within the advertising industry of the value of highly-engaging advertisement impressions. For example, the increased availability of the Internet and early web content in the 1990s provided a new advertising medium in the form of web page banner advertisements. These "banners" were valued for their low cost per impression. However, such untargeted impression-based advertising suffered from low engagement levels, and rarely garnered audience member's attention, which was measured in terms of a click-through rate.

More recently, Google's keyword targeted "Adwords" and other similar targeted forms of advertisements, such as behavioral targeting, improved advertising techniques by targeting the viewing or activity context of the viewer. The aforementioned targeted advertisements are able to realize much higher levels of engagement, e.g., higher click-through rates, than untargeted banner advertisements had previously provided.

Despite the existing amount of television usage and the importance to advertisers of engaging an audience, there exists a lack of a cost-effective technology to measure the engagement of, e.g., television audiences during advertisements. Television advertisements are primarily measured by their ratings. These ratings are determined by the number of viewers associated with a program during which the advertisements are shown. This measurement technique is a relatively old technology, analogous to the impressions of online banner ads. For example, Nielsen Media Research has provided ratings of television programs for decades using audience logs, both electronic and hand-written diaries.

Other costly measurement techniques have also been employed. For example, some marketers have performed engagement level studies of relatively small audiences through, e.g., conducting surveys or performing manual observation of focus groups. However, such aforementioned techniques are too laborious, time consuming and expensive to apply to a large sample including large audience and/or for multiple advertisements. In addition to being expensive, the small sample size is often prone to statistical invalidity. Thus, the use of engagement level studies is limited.

Furthermore, the increased marketplace adoption of television technologies such as digital video recording ("DVR"), picture-in-picture viewing ("PIP"), Internet web browsers and applications (including "apps" for over the top ("OTT") television technology), have provided the viewer with increased opportunities to have minimal engagement levels with television advertisements, if not to skip over advertisements entirely. Accordingly, television as an advertising medium faces increased challenges with respect to both attracting and maintaining audience engagement.

For at least these reasons, there exists a need for a technology to measure the engagement level of television audiences with high accuracy, statistical validity, and cost effectiveness, in order to provide feedback to advertisers about the effectiveness of television advertisements beyond a simple ratings metric.

DETAILED DESCRIPTION

A system and method are disclosed herein that measure audience engagement with a program based on the time a user spends viewing the program. Generally, the longer a viewer stays tuned to a program, the more engaged the viewer is with the program and, consequently, with the advertisements shown during that program. For example, a study by ZenithOptimedia in 1999 found that higher persistence U.S. television viewers, defined as those watching more than half of a TV program, were 44% more likely to remember advertising in the program than those who watched less. A program's ability to retain viewers is referred to herein as the "stickiness" of the program. The viewership for a program is determined by the system and then compared to viewership of various other programs in order to assess the audience retention for the analyzed program as compared to the retention of the other programs. The system calculates a "stickiness index" for the program, which is a numerical representation of the analyzed program's stickiness as compared to the average of the other programs. The system may generate a report including the analyzed data and calculated stickiness index for advertisers, agencies, media sellers, or other parties that are interested in assessing viewership of the analyzed program.

The system and method operates on tune data that can be generated by, or collected from, a variety of different content-delivery channels and delivery platforms. For example, the tune data may be generated by a live, traditional television transmission platform and viewing method, such as a live television transmission over terrestrial airwaves, a live transmission over a coaxial cable network, or transmission over a satellite communications link. Some embodiments may operate on tune data generated by other television transmission and/or viewing platforms, including, but not limited to: video-on-demand, Internet or web TV, DVR content, mobile video, and the like. The tune data for measuring audience engagement can be obtained, for example, from television set top boxes ("STBs"), people meters, set meters, or other sources capable of storing the generated tune data.

The system utilizes the tune data collected from the various content delivery platforms to determine an estimated percentage of viewership, e.g., viewers tuned to a specific channel during a specified program. The viewership data of a program can be aggregated and averaged for the length of a program to determine an average percentage of the program viewed. For example, three viewers (A, B, C) viewing an hour long program X on channel Y have corresponding tune data provided to the system. The tune data indicates that viewer A viewership is 78% (i.e., viewer A viewed 78% of the program, calculated as the total viewing seconds—whether or not contiguous—divided by the total duration of the program in seconds), viewer B viewership is 34% and viewer C viewership is 100%. The aggregate viewership is then found to be 71%. The average viewership is used by the system to calculate a stickiness index for programs as compared to the average. The stickiness index may be based on an averaged viewership for programs sharing a similar attribute to the program being measured. The attribute can include various aspects of the program, such as program length, genre, airtime, etc.

Once the stickiness index of the program is calculated, a report is generated by the system in order to provide an end-user, such as a cable provider or an advertiser with engagement levels of a program in comparison to other programs. The report can include a chart having four (4) quadrants with various combinations of stickiness index and rating index. Each program can be represent on the chart as a data point, defining the program as having a high or low level of engagement and the corresponding rating of that program. The report can additionally include a statistical summary of each program represented on the chart.

The disclosed system and method may be implemented in systems described, for example, in U.S. patent application Ser. No. 13/081,437, filed Apr. 6, 2011, entitled "METHOD AND SYSTEM FOR DETECTING NON-POWERED VIDEO PLAYBACK DEVICES"; and U.S. patent application Ser. No. 13/096,964, filed Apr. 28, 2011, entitled "METHOD AND SYSTEM FOR PROGRAM PRESENTATION ANALYSIS," which are each hereby incorporated by reference in their entirety. Additional information about how the system collects data for measuring audience engagement is described in detail herein.

Various embodiments of the invention will now be described. The following description provides specific details for a thorough understanding and an enabling description of these embodiments. One skilled in the art will understand, however, that the invention may be practiced without many of these details or with variations which are not specified here but which follow from the description in a way that will be clear to one skilled in the art. Additionally, some well-known structures or functions may not be shown or described in detail, so as to avoid unnecessarily obscuring the relevant description of the various embodiments. The terminology used in the description presented below is intended to be interpreted in its broadest reasonable manner, even though it is being used in conjunction with a detailed description of certain specific embodiments of the invention.

Figure 1:
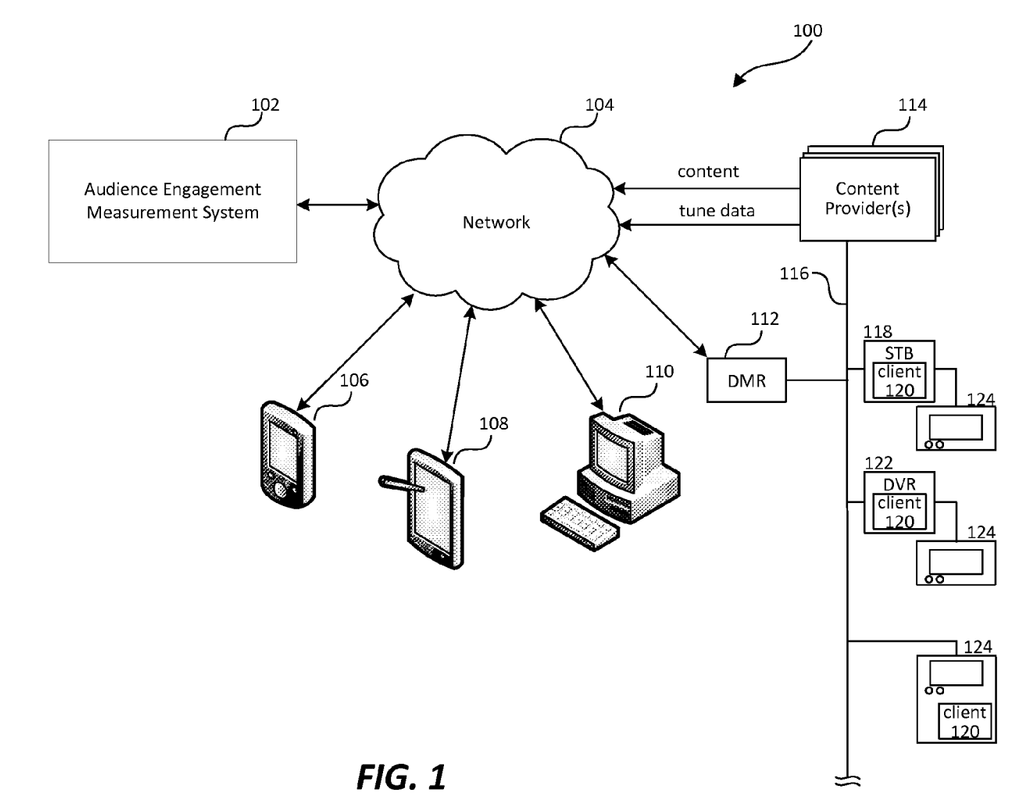
FIG. 1 illustrates an environment in which a system for measuring audience engagement operates for determining relative viewership for a program.

FIG. 1 and the following discussion provide a general description of a suitable computing environment 100 in which a system ("system") 102 for measuring audience engagement is implemented.

The system 102 is configured to receive tune data from one or more content providers 114. In the representative environment, the depicted content provider 114 is a cable television operator that transmits program signals on a cable 116 (e.g., coaxial, optical). Content providers also include, but are not limited to, satellite television operators, local or regional broadcasters, and distributors of content over other transmission media such as the Internet or other network. Subscribers and end users view the program signals on televisions, video monitors, or other audio/video playback devices 124 (each of which is referred to herein as a "video playback device").

Each of the video playback devices is associated with a corresponding internal tuner or external set top box (STB) 118 that serves as an interface between the video playback device and the cable 116 or other transmission means on which the television program or other audio-video content is received. In some embodiments, the set top boxes 118 comprise cable television converters or satellite dish receivers. However, set top boxes can also include digital video recorders (DVR), gaming consoles, audience measurement meters or other electronic components, which either allow a user to tune to a desired audio/video stream, or provide the functionality of recording tune events for later analysis. Broadly stated, the phrase "set top box" is used herein to refer to any device, component, module, or routine that enables tune data to be collected from an associated video playback device. Set top boxes may be stand-alone devices or set top box functionality may be incorporated into video playback devices.

The content providers 114 may also directly transmit content to other video playback devices via network 104. For example, video playback devices may also include smartphones 106, computers 110, and tablets 108. Content may be directly streamed to the video playback devices from content provider 114, or indirectly via devices such as digital media receivers (DMRs) 112. As used herein, a "video playback device," therefore, also encompasses computers, smartphones, laptops, tablets, or other computing devices capable of displaying content provided by a content provider.

The content provider 114 receives signals indicative of tuning and other events that occur on video playback devices. The tuning events can represent such things as channel changes, recording or replaying of content that was transmitted to a STB, and changes in play back of content, such as when a subscriber pauses, fast forwards or rewinds a program or otherwise varies its normal playback. In addition, the tuning events may indicate when a subscriber requests information from an interactive television subscription service.

The tune data is collected for the content provider 114 by clients 120 that are incorporated in or are associated with set top boxes 118 or video playback devices. A "client" refers to a software or hardware module within a device that is capable of monitoring, collecting, storing, and communicating tune data from a video playback device. The tune data is communicated to a content provider and/or third party for further analysis. The type of client 120 depends on the particular video playback device in which it is incorporated. As one example, a client 120 may be integrated in a set top box 118. The STB may be coupled to a monitor or other display, for example a STB 118 coupled via a coaxial cable to an analog television, or a STB 118 coupled via an HDMI or other digital signal channel to a digital television or other digital video display equipment (e.g., a computer monitor, video projector, etc.). The STB may include a digital video recorder ("DVR") that is configured to record one or more live video broadcast streams and is capable of providing deferred viewing or "time shifting" of a particular live broadcast that occurred at a certain time.

As another example, a client may be directly built into a device having a monitor or display, such as a television 124 or a computer 110. For example, a client may be software in a personal computer 110 with a television tuning card capable of receiving a television broadcast over the air or over a cable television network. In another example, a personal computer 110 may have a client and receive a television broadcast over the Internet, e.g., via Internet, web television, IPTV, or similar streaming mechanism. In yet another example, a client may be incorporated in a mobile device, such as a mobile smartphone 106, that receives television over a wireless network. "Television" as used herein means not only live video broadcast over the air, cable, or satellite communications channels and consumed as it is delivered, but also includes any other form of transmission and consumption of video programs and advertisements. For example, "television" includes time-shifted video and advertisement viewing (such as content recorded during a broadcast by a digital video recorder and played back subsequently), the viewing of video on demand, the transmission of video and advertisement content over a packet switched network (such as but not limited to the Internet, Internet protocol television, web television, streaming video, etc), transmission via a wireless network (such as to a mobile phone with a video display over a 3G/4G network, or IEEE 802.11 family wireless network), and the like.

In some embodiments, a client 120 may be integrated into equipment (not shown) serving multiple end users, such as head-end equipment of a cable television system, or head-end equipment of an internet communication network, or a single master antenna television ("SMATV") head-end that receives and rebroadcasts satellite television signals throughout a property.

Each client 120 records tune data associated with the associated video playback device. The client tracks or monitors the viewer using a method that is appropriate to the device in which the client is incorporated. For example, a STB client may determine that one or more viewers are likely viewing a video broadcast if the STB has recently received a channel, volume, or other input from the viewer via the remote control. In another embodiment, a STB client can determine that a particular viewer associated with that STB is likely viewing a video broadcast if the STB is turned on. In yet another embodiment, a DVR client can determine that a viewer is likely watching a video broadcast if the viewer provides a command to play back video content from a previously recorded video broadcast.

Events reflecting viewing behavior that are tracked by a client may include, but are not limited to: a command to power-up or power-down a corresponding monitor or display, a channel or content switching event, such as channel changing events (e.g., "channel up", "channel down", "switch to channel 5", "switch to channel 13.2" (i.e., main channel 13, sub-channel 2), "access pay per view content channel 20", etc.) with or without the use of an electronic program guide, or commands controlling the playback of prerecorded content (e.g., "play", "stop", "fast forward", and "rewind" for content prerecorded on a DVR device, etc.). Each event is recorded by the client with an associated date/time stamp reflecting when the event occurred. To store tune data, for each event the client 120 may include a unique identifier associated with the set top box or video playback device, an identifier of the tune action (e.g., channel change, play, pause, etc.), an identifier that directly or indirectly identifies content being viewed (e.g., a channel that was tuned, or a unique identifier associated with the tuned content), and a time and date stamp indicating when the tuning event occurred. It will be appreciated that a greater or lesser amount of tune data for each event may be captured by a client.

Tune data is transmitted from clients 120 to content providers 114 and/or third party aggregators of tune data. A content provider or third party-aggregator may then periodically or continuously provide the tune data to the system 102. Alternatively, clients 120 may transmit the tune data directly to the system for measuring audience engagement 102. In some embodiments, the tune data is continuously transmitted by the client 120 to the intended recipient. For example, the client may continuously report tune data in cases where the client has an available and robust network connection, such as when a client is on an IPTV network. In such circumstances, the client need not cache (i.e., store) data on the client device. In some embodiments, the tune data is periodically transmitted by the client 120 to the intended recipient. For example, the client may send tune data at predetermined intervals to the intended recipient. For example, the client may transfer the cached data to the system 102 or intended recipient every 6 hours, every time the associated STB is powered "on," every evening at 3 am, etc. Between transmissions, the client caches the tune data. When the client caches the tune data, the client employs local storage such as random access memory, a mass storage device (such as the mass storage device used by DVRs), flash drive storage, or other storage devices known in the art.

In some embodiments, a client may only transmit the tune data to the intended recipient when the intended recipient requests the client to deliver the data (i.e., a "pull" transaction). In some embodiments, the client can decide when to send the data to the intended recipient (i.e., a "push" transaction). For example, the client may transmit the tune data any time the client has new data available that has not yet been transmitted. In another example, the client may cache the tune data in a buffer, and transmit the data when the cache buffer is becoming full to minimize the number of times the client must transmit data.

In some embodiments, the client may transmit all cached tune data at a specific and reoccurring time, such as every day at 2:00 AM, every Monday at midnight, once per month on the 26th day of the month, or once per year on every June 26th, and so on. In other embodiments, a predetermined event may trigger the transmission of tune data. For example, when the client device is powered on or off, the device's booting or shutdown procedure can trigger the transmission.

The system for measuring audience engagement 102 receives tune data from content providers 114, from third-party aggregators of tune data (not shown), and/or directly from clients 120. The tune data can be received over networks 104, such as public or private networks, and wired or wireless networks, including the Internet. Alternatively, on a periodic basis, the tune data may be provided to the system 102 by a content provider or third-party aggregator on a computer readable media such as tape drive, DVD, CD-ROM, flash drive, mechanical or solid state hard drive, etc.

Figure 2:
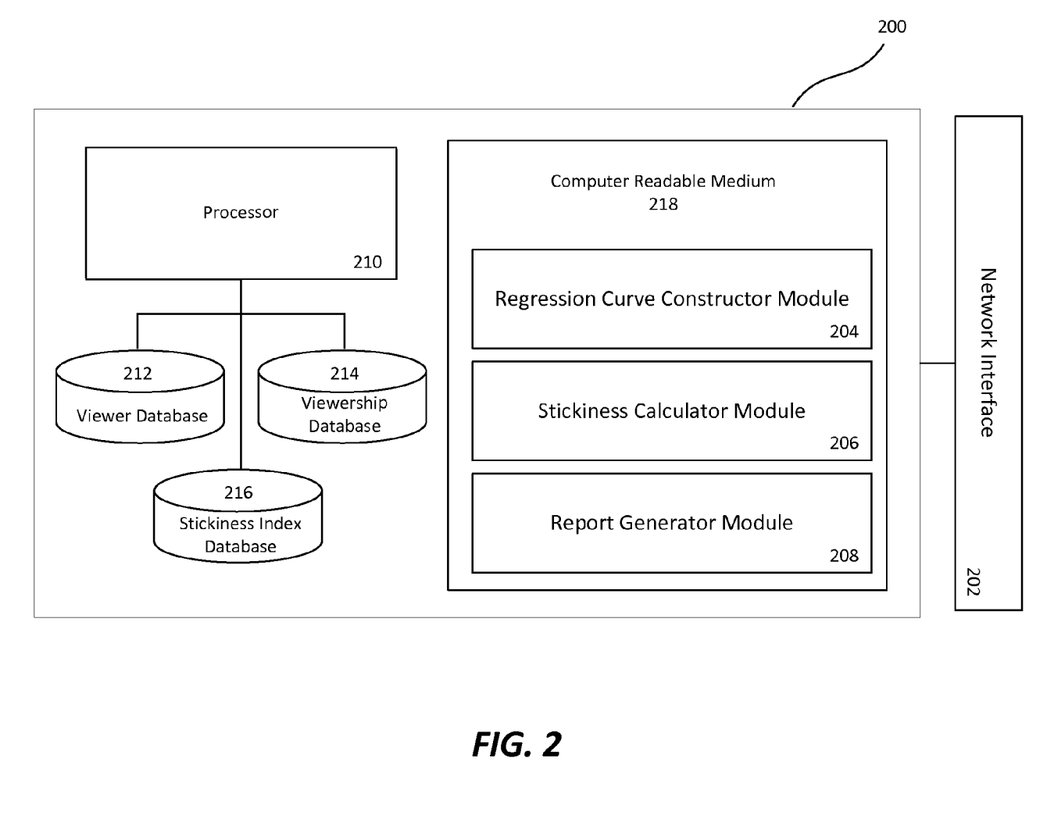
FIG. 2 is a representative computer system for use in the system of FIG. 1.

FIG. 2 is an exemplary computer system on which the system for measuring audience engagement 102 can be implemented. The system 200 receives the tune data over a network, as previously-described. The system 200 stores the tune data in a viewer database 212.

The system 200 includes a non-transitory computer-readable medium ("CRM") 218 on which computer-readable instructions are encoded for performing an analysis of the tune data. The CRM is coupled to a processor 210, which executes the stored instructions in order to implement the functionality disclosed herein. In particular, the system 200 includes instructions specifying a particular module of one or more modules located within the CRM 218 to perform a function on the stored tune data. For example, the CRM 218 can include a curve generator module 204, a stickiness calculator module 206, and a report generator module 208. The operation of each will be described in turn.

The curve generator module 204 analyzes tune data for various programs having equal program length and other selected corresponding attributes (e.g., genre, airtime, etc.), to determine an average percentage of a program viewed by an audience over the length of the analyzed programs. The aforementioned percentage is referred to herein as the "viewership" of a program, calculated as the total viewing seconds—whether or not contiguous—divided by the total duration of the program in seconds. The curve generator module 204 generates a regression curve based on historical viewership data calculated using previously-stored tune data. In some embodiments, the curve generator module 204 determines two or more percentile curves for programs or daypart curves for programs of equal length and airing at particular times of a day. The curve generator module 204 stores the curve data for various program types in a viewership database 214.

The stickiness calculator module 206 assesses the stickiness of a specified program based on the data associated with that program, e.g., program length and/or other attributes. The stickiness calculator module 206 gathers the historical viewership data, such as previously-generated curves, corresponding to the data associated with the program and calculates a stickiness index of the particular program. For example, the stickiness calculator module divides the viewership of the program by the averaged, historical viewership corresponding to the program found on a generated curve. Alternatively, the stickiness calculator model might use a more complicated function of the historical data. One skilled in the art will recognize that there are many possible ways to compare the viewership of the particular program to the viewership of the historical programs. The resulting number can then be scaled (e.g., multiplied by 100) to determine the stickiness index of that particular program. The calculated stickiness index for particular programs is stored in a stickiness index database 216 for later use, such as when generating a curve for future stickiness calculations.

The report generator module 208 generates reports of the analysis and provides the report to advertisers, agencies, media sellers, or other parties that are interested in measuring the engagement level or other aspects or metrics of advertisements. The report generator module 208 can generate visual graphics as well as statistical summaries of data related to the programs for which a stickiness index is calculated. The functionality of the report generator module 208 and each of the aforementioned modules will be further described with respect to FIGS. 3-8.

One skilled in the art will understand that aspects and implementations of the system have been described in the general context of computer-executable instructions that are executed on a server computer. It will be appreciated that the disclosed technology can be practiced with other computer system configurations, including desktops, laptops, multiprocessor systems, microprocessor-based systems, minicomputers, mainframe computers, or the like. The disclosed technology can be embodied in a special purpose computer or data processor that is specifically programmed, configured, or constructed to perform one or more of the computer-executable instructions explained in detail below.

The terms "computer" and "computing device," as used generally herein, refer to devices that have any data processor and non-transitory memory containing instructions that are executed by the processor. Data processors include programmable general-purpose or special-purpose microprocessors, programmable controllers, application-specific integrated circuits (ASICs), programmable logic devices (PLDs), or the like, or a combination of such devices. Software may be stored in memory, such as random access memory (RAM), read-only memory (ROM), flash memory, or the like, or a combination of such components. Software may also be stored in one or more storage devices, such as magnetic or optical-based disks, flash memory devices, or any other type of non-volatile storage medium or non-transitory medium for data. Software may include one or more program modules, which include routines, programs, objects, components, data structures, and so on that perform particular tasks or implement particular abstract data types.

The disclosed technology can also be practiced in distributed computing environments, where tasks or modules are performed by remote processing devices, which are linked through a communications network, such as a Local Area Network ("LAN"), Wide Area Network ("WAN"), or the Internet. In a distributed computing environment, program modules or subroutines may be located in both local and remote memory storage devices. Aspects of the technology described herein may be stored or distributed on tangible, non-transitory computer-readable media, including magnetic and optically readable and removable computer discs, stored in firmware in chips (e.g., EEPROM chips). Alternatively, aspects of the invention may be distributed electronically over the Internet or over other networks (including wireless networks). Those skilled in the relevant art will recognize that portions of the system may reside on a server computer, while corresponding portions reside on a client computer in communication with the server computer.

Figure 3:
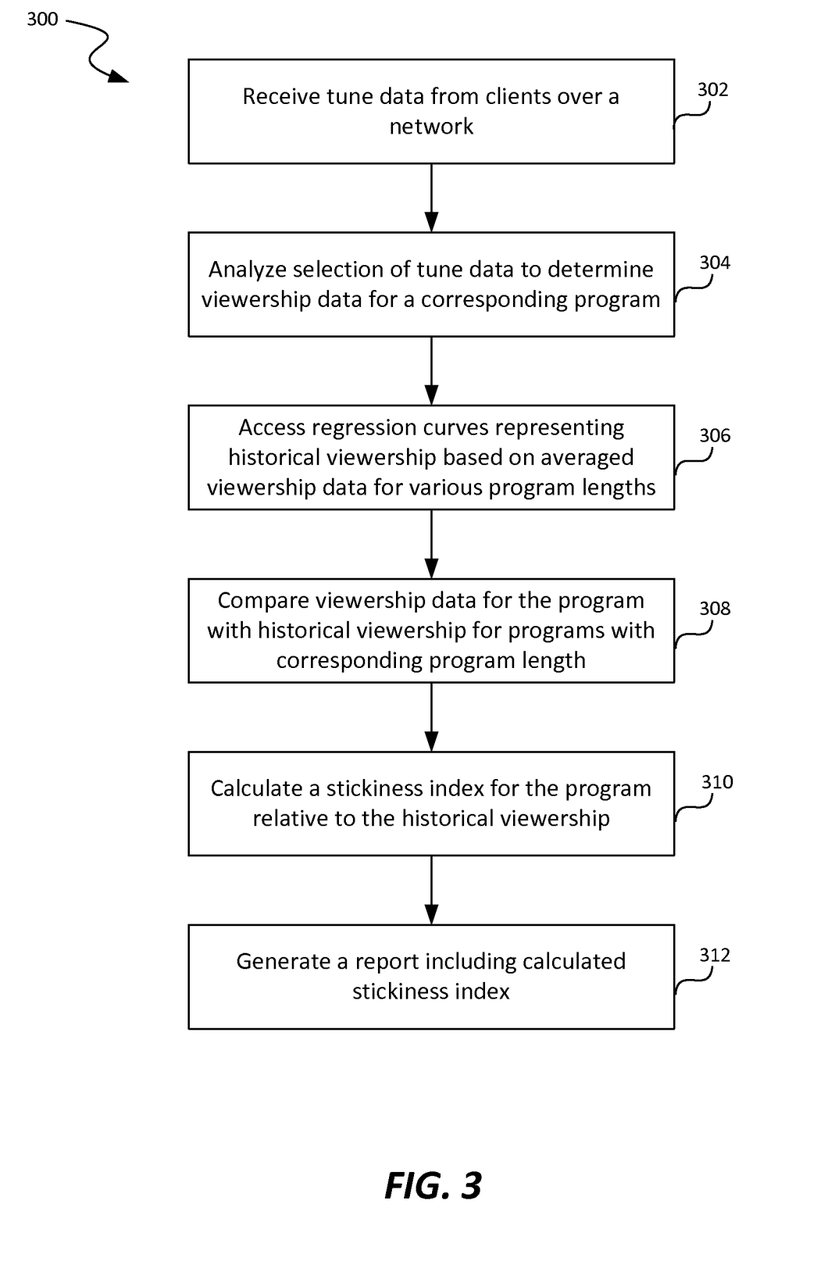
FIG. 3 is a flow diagram of a process performed by the system for measuring audience engagement to determine an index of relative viewership ("stickiness Index") for a program.

FIG. 3 is a flowchart of a process 300 for measuring audience engagement that is implemented by the system 200. One difficulty arises in comparing the engagement levels of programs with differing durations. To allow comparison of audience engagement across programs of differing duration, a statistical model may be utilized to normalize the average amount of time that an audience views a program based on the length of the program. Accordingly, the audience engagement is determined by an average percentage of viewership for a program relative to a historical average of viewership for a program having similar attributes. A "program" is any audio or video content presented over a specified time frame on a particular distribution channel. A program may therefore be defined as a particular piece of content (e.g., "60 Minutes") or content associated with a certain time period and distribution channel (e.g., content presented on channel 9, or a particular national television network such as ESPN, from 8:30 pm to 9:45 pm on Wednesdays in a specified data range). Programs can be rated by the number of viewers for that program, e.g., as determined through clients reporting tune data associated with that program.

At block 302, the system receives tune data from one or more clients over multiple platforms supported by the network. The clients, through various video playback devices, collect and send tune data through a network to the system for measuring audience engagement. The tune data can be current tune data, such as real-time, or tune data from previously stored content, such as in the case of a DVR associated client. The system can receive the tune data through various communication channels over the network and can store the tune data on a database located within the system for analysis and use to construct an index to which a program is compared. The tune data can be saved corresponding to a particular client, such as in week long increments.

At block 304, the system analyzes the tune data to assess viewership for a selected program. In the case of a specific program, the tune data may be analyzed based on clients providing tune data from various content delivery platforms, such as streamed content through the Internet, a playback on a DVR, or live viewing recorded on a STB such as during an original broadcast on television. In some embodiments, the system selects tune data from only one content delivery platform to analyze. In other embodiments, the system determines various other attributes by which to analyze the tune data. For example, the system may select a specific platform, a specific time of day ("daypart"), a program length and viewer regions (e.g., "Southeast" or "California"), a genre (e.g., "Sports" or "Situation Comedy"), etc. in order to analyze the tune data. The system selects the tune data for a specific program that is being analyzed.

At block 306, the system selects one or more curves representing historical viewership for various program lengths. The curves can include, for example, regression curves based on averaged viewership data to which "best-fit" curves have been fitted. In some embodiments, the curves are already constructed such that the system can retrieve a corresponding curve or curves as generated by the regression curve constructor module 204. The historical viewership curves can be constructed in an ongoing basis, such as when any new data is received by the system, on a periodic basis, or when a new analysis is performed for a specific program. The curves are selected based on the corresponding program being analyzed. For example, the system may select curves sharing one or more attributes of a program under analysis, such as a set of curves representing comedy programs having a length of one (1) hour and broadcast after 5:00 pm. If curves are constructed at the time of a program analysis, the system analyzes historical tune data, calculates the viewership associated with each reporting client, and aggregates the calculated viewership in order to construct a historical viewership curve defined by the selected tune data. As will be described in additional detail herein, in some embodiment more than one curve is generated, e.g., for percentiles, or, accordingly to variable attributes.

At block 308, the system compares the viewership for the particular program being analyzed with an average viewership of a similar program type. The average viewership is represented by the selected historical viewership curve or curves. In some embodiments, the similar program type can be programs having the same content presentation time period, or length, which are analyzed to define the historical viewership to which the program viewership is compared.

At block 310, the comparison of the program viewership relative to the historical viewership curves provides a fraction, which can be calculated to form a numerical representation of a percentage, above or below 100. This calculation provides the "stickiness" of the program relative to the average stickiness defined by the curves to which the program's viewership is being compared.

At block 312, the system generates a report of the results from the analysis performed on the particular program. The report can include both stickiness and viewership for the particular program being analyzed as well as the corresponding stickiness index and viewership data from programs against which the particular program was compared. In some embodiments, the report may include the curves against which the program viewership was compared as well as the data points for the program on those curves. The report can be generated for a particular program being analyzed, or, for programs sharing common attributes in order to provide general viewership data. In some embodiments, the report can provide a summary for a specified program or groups of programs as well as a visual metric, e.g., graph, of one or more programs demonstrating the engagement levels of those programs. Such graphs are illustrated and described with reference to FIGS. 6-8.

Figure 4A:
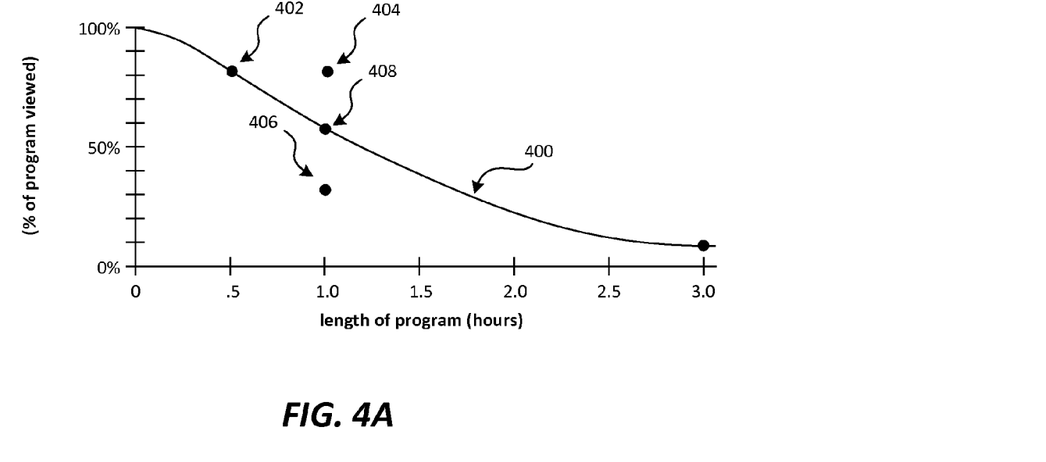
FIG. 4A is a representative graph of average viewership for various program lengths.

FIG. 4A is a representative graph that is generated by the system and represents the average viewership (50th percentile) for various program lengths. The graph includes a curve 400, from which a "stickiness index" may be derived for programs of various durations, or lengths. As disclosed herein, a program "length" can be defined by duration, time, presentation period or other reference to a time interval in which content is broadcast to an end user and the corresponding tune data is collected by a client device associated with that end user. The curve 400 represents the average percentage of a program viewed by an audience, i.e., "viewership" (y-axis) for a variety of program lengths (x-axis). Depending on the length of the programs being measured by the system, the x-axis, defining the program length, can be measured in various increments. For example, a graph constructed for children's programs may include fifteen (15) minute increments for a maximum of 1.5 hours. In the depicted embodiments, the increments are thirty (30) minute time intervals for programs up to three (3) hours long. By "average," the graph represents a 50th percentile curve. For example, as illustrated in the curve 400, if a program is 30 minutes, 50 percent (%) of the program viewers watch 80 percent (%) of the program, signifying that the average viewer watches 24 minutes. In contrast, if a program is 1.5 hours in length, 50% of the program viewers watch less than half (38%) of the program, signifying that the average viewer watches 38% of 90 minutes, or 34 minutes.

The curve 400 may be constructed, for example, by obtaining actual viewership data as described in the previously-incorporated pending '437 and '964 applications. The curve 400 is typically nonlinear and may be determined by regression analysis, in order to achieve a relative best fit to the average data for some or all programs of various lengths for which data is available. In one embodiment of the invention, the curve 400 may be determined by regression analysis of a nonlinear equation such that the curve fits the data consisting of all programs having data in the system. Accordingly, as new viewership data is received by and stored on the system, the curve can be reconstructed in order to incorporate any new trends in the viewership.

Viewership associated with a particular program being analyzed may be obtained and compared with the curve 400 to assess whether the program is above, at, or below the historical (i.e., average) viewership across all programs. For example, a point 402 associated with a program is located on the curve 400, signifying that the viewership for the program associated with point 402 is average as compared to the population of all programs having at least one shared attribute, such as other programs of length 30 minutes, or 0.5 hours. In another example, a point 404 associated with another program is located well above the curve 400, signifying that average viewership for the associated program has higher than average engagement value for program length of one hour. In another example, a program associated with a point 406 is located below the curve 400, indicating that the show has below average viewership when compared to an average viewership of all programs having a program length of one (1) hour.

Rather than merely assessing whether a point is above, at, or below average, a numerical value (or "stickiness index") can also be calculated that represents the relative performance of the associated program as compared to the average. The stickiness index can be calculated from a mathematic formula which varies the index proportionally with the curve. For example, the average value on the curve 400 for an hour long program is indicated to be 55 percent (%), such as at point 408. The value of 80% at point 404 may then be divided by the value of 55 percent (%) at point 408. The resulting value is then multiplied by one hundred (100) to derive a stickiness index of 145 for the program associated with point 404. An equation representing the stickiness index for the 1 hour long program represented by point 404 is further provide below:

$$80 \div 55 = 1.45$$

$$1.45 \times 100 = 145 \text{ (stickiness index)}$$

A higher stickiness index, e.g., above 100, indicates a program with a higher than average retention of viewers, and a lower stickiness index, e.g., below 100, indicates a program with a lower than average retention of viewers.

Figure 4B:
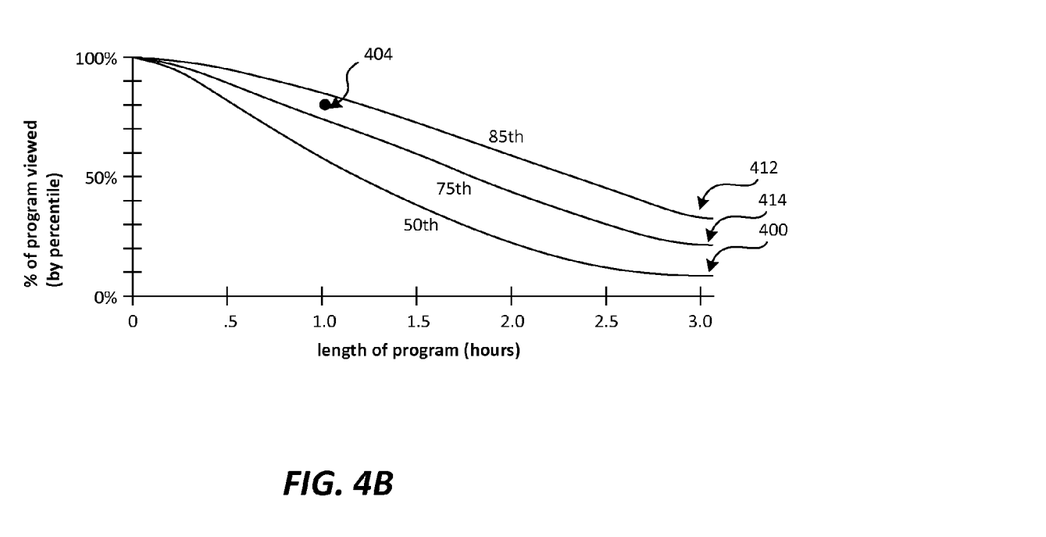
FIG. 4B is a representative graph of various percentiles of viewership used by the system to calculate a stickiness index for a program.

As depicted in FIG. 4B, in another embodiment, the system may construct multiple curves 412, 414, 400, representing different percentiles, each characterizing the programs of various lengths. As noted with respect to FIG. 4A, curve 400 represents an "average," or 50th percentile curve. Other curves, such as a 75th percentile curve 414 and a 85th percentile curve 412, may be calculated for the measured corpus of program data. Once multiple curves have been generated, the system may calculate the stickiness index by interpolating between the multiple curves. For example, in FIG. 4B, data point 404 falls between two nearby curves; the 75th percentile curve 414 and the 85th percentile curve 412. The system may therefore determine that the percentile associated with point 404 is halfway between the percentiles 75th and 85th associated with those curves, 414 and 412, respectively, and calculate an interpolates percentage of 80% for point 404. The system may then derive a stickiness index using the interpolated percentile of 80%. For example, 80% may be divided by the value for the audience average value of 55%, at the same program length as point 404, and then be multiplied by one hundred (100) to derive a stickiness index.

Curve 400 has been characterized as representing an average viewership across all programs. In some embodiments, the curve 400 or curves 412, 414, may be derived from a subset of all programs, chosen to be "comparable," based on at least one attribute, to the program for which engagement is to be calculated. Attributes defining a subset can include, for example, programs on the same television network, programs with the same airtime (i.e., at the same time of day), and programs distributed by the same distribution platform or viewed with the same viewing method. For example, programs having the same distribution platform can include programs transmitted by live, over the air broadcasts, programs consumed using a DVR or other time shifting apparatus, programs consumed using live television, cable television, Internet Protocol television ("IPTV"), content viewed with time-shifting, such as a DVR, live video consumption, mobile video consumption, web video content that is distributed through a particular web site or Internet domain (e.g., nbc.com, youtube.com, etc.). Attributes can additionally include programs with the same genre, such as situational comedies, movies, sports programming, reality television, drama, etc. By generating curves that are specific to a particular genre, for example, a performance of a particular program in a corresponding genre may be benchmarked against other programs that are considered to be its peers.

The system may utilize engagement metrics and associated average curves that are specific to particular television delivery platforms or viewing methods, such as live viewing, time-shifted viewing using a DVR, streaming download of content over the Internet, etc. Alternately or additionally, the system may utilize engagement metrics and associated average curves that are specific to multiple television delivery platforms or viewing methods, such as live viewing combined with time-shifted viewing.

In some cases, the system allows data from one type of television delivery platform or viewing method to be compared with data from another type of television delivery platform or viewing method. For example, the system may adjust or scale its underlying curves from one television delivery platform or viewing method to make it approximate the data of another curve, or the system may adjust or scale the engagement index or metric for a particular delivery platform or viewing method to allow comparison of that index to the engagement metric for another delivery platform or viewing method.

In order to obtain the viewership data to construct each curve and determine a position of a particular program on a curve, the system determines an average percentage of the program which was viewed from tune data received via clients. Viewership, or the average percent viewed, is a function of both the audience engagement and the duration of the program. Since less time is consumed to view a given percentage of a shorter program than time consumed to view the same percentage of a longer program, the model can allow for the comparison of the engagement of programs with different durations that would not otherwise be directly comparable after normalizing the results. For example, viewing 50 percent (%) of a half hour long program takes only 15 min, whereas viewing 50% of an hour long program takes 30 min. In addition to individual programs being indexed, averages of multiple programs, such as a series of programs across a season, multiple instances of the same program across different broadcast networks, etc., can also be indexed against the curve(s) at an averaged program length for those multiple programs. This can allow for engagement levels of the multiple programs to be meaningfully analyzed and compared. In this way, the engagement dependence of the average percent viewed is disentangled from the merely duration-dependent effect.

In addition, for a particular level of engagement, the expected duration of viewing can vary by daypart. In some embodiments of the engagement measurement system may take this into account as an attribute by which to define stickiness for a particular program. For example, people on average spend less time viewing television in early morning, e.g., getting ready for work, than they do viewing television in the evening, e.g., resting after work. Similarly, many viewers are less active late at night, e.g., sleeping. Accordingly, a viewership of a one (1) hour program at 2 a.m. may not be comparable to a viewership of a program of similar length at 7 p.m. Curves by daypart may, therefore, be generated by the system in order to account for lower and higher average viewing periods.

Figure 5:
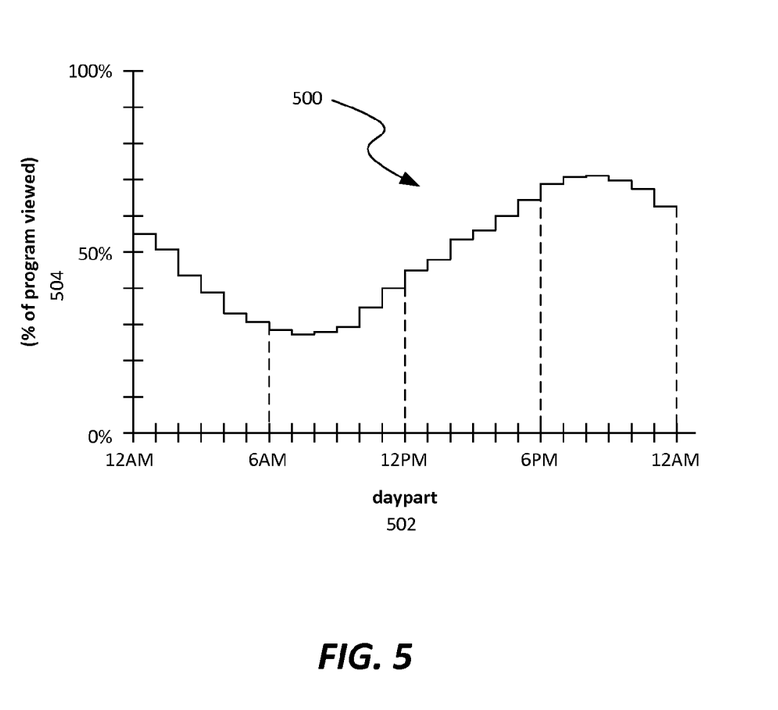
FIG. 5 is a representative graph of viewership by daypart and presentation time.

Referring now to FIG. 5, an exemplary curve 500 by daypart is provided. The curve 500 illustrates one (1) hour long dayparts, for a set of programs all having the same program length. For example, the curve 500 in FIG. 5 may reflect the percentage viewed of a one (1) hour program at different times of the day. The average viewing length of a one (1) hour program is, therefore, lowest in the morning (6 a.m.-8 a.m.) and highest in the evening (8 p.m.-9 p.m.).

The system utilizes multiple daypart curves 500 to generate a length of program curve, e.g., curve 400 in FIG. 4A, for each part of the day reflected in the daypart curve 500. The aforementioned program curve 400 may be generated by multiplying or averaging the indices resulting from the multiple curves together, or, by taking the output index from one curve and inputting it into another curve.

The stickiness indices may be derived from the daypart curves in order to determine a more precise stickiness for a program. The dayparts utilized may have uniform time durations, such as 1 hour per each daypart, or, alternatively, various durations. For example, an "Early Morning" daypart may be from 6 a.m.-10 a.m. and last four (4) hours, and a "Daytime" daypart may be from 10 a.m.-4:30 p.m. and last 6.5 hours. In additional embodiments, the system may analyze certain days of the week or times of the year differently. For example, weekdays may be analyzed differently than weekends, just as holidays may be analyzed differently than non-holidays, in order to account for more audience to be present at home and capable of viewing the television.

Accordingly, a viewership curve utilized to define a stickiness index for each daypart, and/or other defined broadcast period, may be constructed with viewership data from programs broadcast only in those allotted dayparts. The manner in which the curves by daypart may be derived, and the manner in which the system uses the curves by daypart to derive stickiness indices may be similar to the description of curves in FIGS. 4A and 4B.

After receiving user input selecting the program(s) for which audience engagement is desired to be analyzed and, optionally, receiving other analysis parameters the system may then display the results of the engagement analysis to the user. The additional analysis parameters may include input specifying, for example, which curves should be applied, such as whether the curve to normalize by daypart, which other programs should the analysis compare the analyzed program against, which set of programs should be used in constructing the curves, etc.

Figure 6:
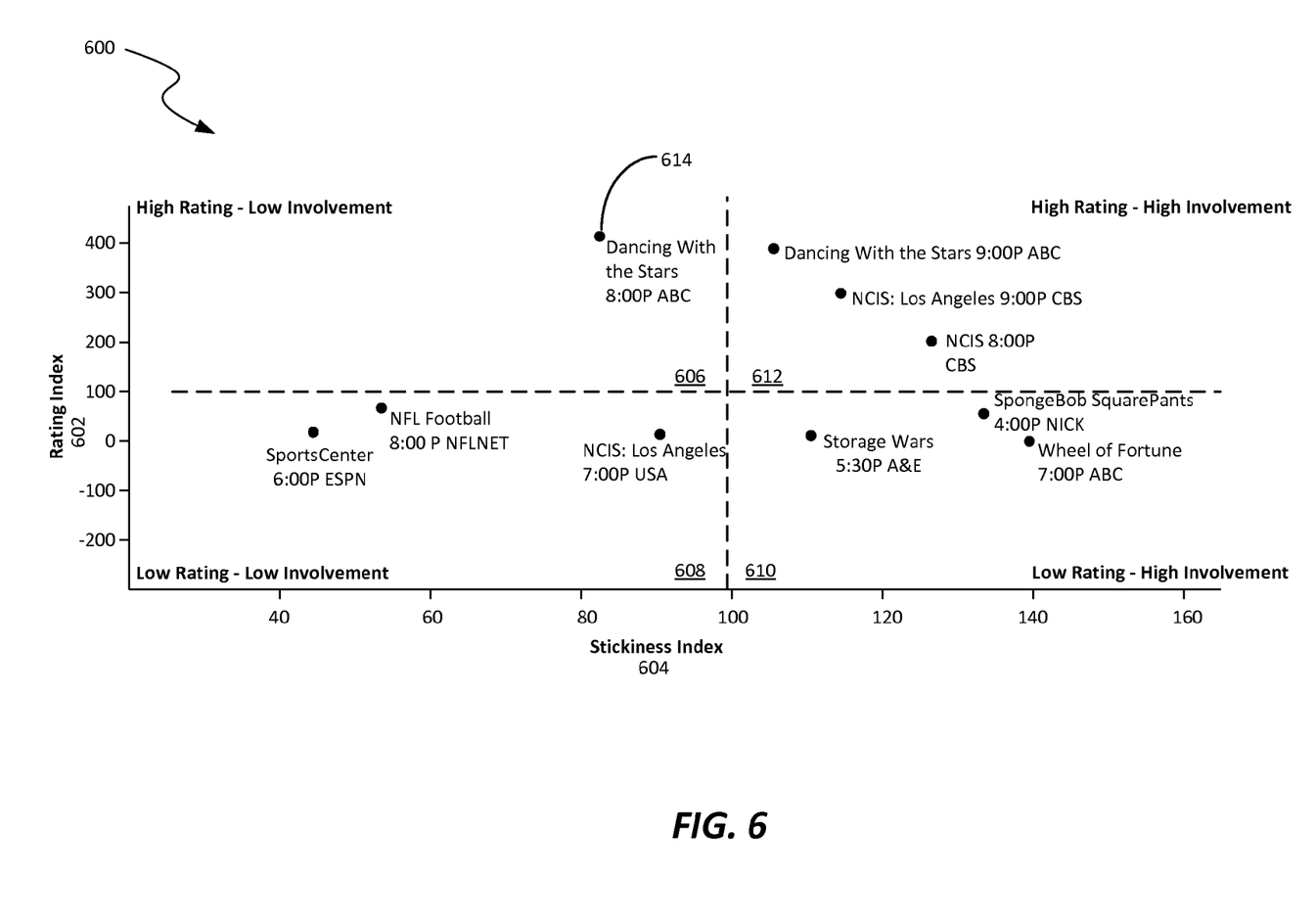
FIG. 6 is a representative chart divided into quadrants of engagement level and rating level used by the system for measuring audience engagement to display viewership for various programs based on a stickiness index.

Referring now to FIG. 6, the displayed results may be formatted into a visual metric, such as graphic chart 600, that displays the stickiness index 604 on the x axis and another parameter 602 on the y axis (e.g., "rating index" in FIGS. 4A-4B). The chart 600 may be additionally divided into multiple regions, each indicating a level of stickiness and a rating. For example, the chart 600 can be divided in to four quadrants 606, 608, 610, and 612, constituting a "quad map" chart. The aforementioned regions defined by the quadrants may be measured in accordance with the x-axis and y-axis which provide that a program inside the region is relatively high in engagement ("involvement") and high in rating, region 612, high in engagement and low in rating, region 610, low in engagement and high in rating, region 606, or low in engagement and low in rating, region 608. As shown, each data point represents a program for which the system analyzed tune data and determined a stickiness via the program's viewership and a historical viewership on which a stickiness index was based. In some embodiments, the chart 600 only displays data points for programs with which a common stickiness index was utilized. In other embodiments, the chart 600 only displays data points for programs sharing a common stickiness index and value on that index. For example, programs sharing a commonly defined stickiness index, such as for points 404 and 406 on the curve 400 shown in FIG. 4A, and sharing a common program length of one (1) hour.

Furthermore, although FIG. 6 illustrates rating measurement 602 in conjunction with engagement measurement 604, other measures may be plotted on the axes and reflected in the chart, e.g., net reach, cost per rating point, etc. The determination of where the division of the chart is made into different quadrants may be according to an average value of the measure, an arbitrary value or a user specified value. For example, an index score of 100, which may or may not constitute average, can be used for the arbitrary value. In some embodiments, programs indicated in the chart may utilize larger or smaller symbols or different colors or shapes to communicate another metric that is desired to be analyzed. For example, a larger circle (e.g., data point 614) may indicate that the program has aired many times, while a smaller circle may indicate that the program has aired fewer times. In another example, the data points can be colored coded as to the station, or channel, on which the program was broadcast. One skilled in the art will recognize that a variety of changes could be made to the manner in which the stickiness of a program is displayed on the chart.

In further embodiments, the displayed results on the chart 600 may include other programs that may be useful for directly comparing with the selected program. The chart 600 may show the same program aired on different networks, such as a particular broadcast network and a particular cable network. the chart may additionally show a particular program against a particular program genre (e.g., all shopping networks), or a particular language (e.g., all Spanish language programs). In further embodiments, the chart 600 may show a particular program and competing programs, other programs specified by the user, various show durations, etc. Additionally, the system may compare various dayparts, such as a show airing at 8 PM on Tuesday may be compared with the same show airing at 9 PM on Thursday. Each chart 600 is determined by the initial user inputs which are utilized to determine the selection of tune data to be analyzed and the defined stickiness index to which a program is compared.

Figure 7:
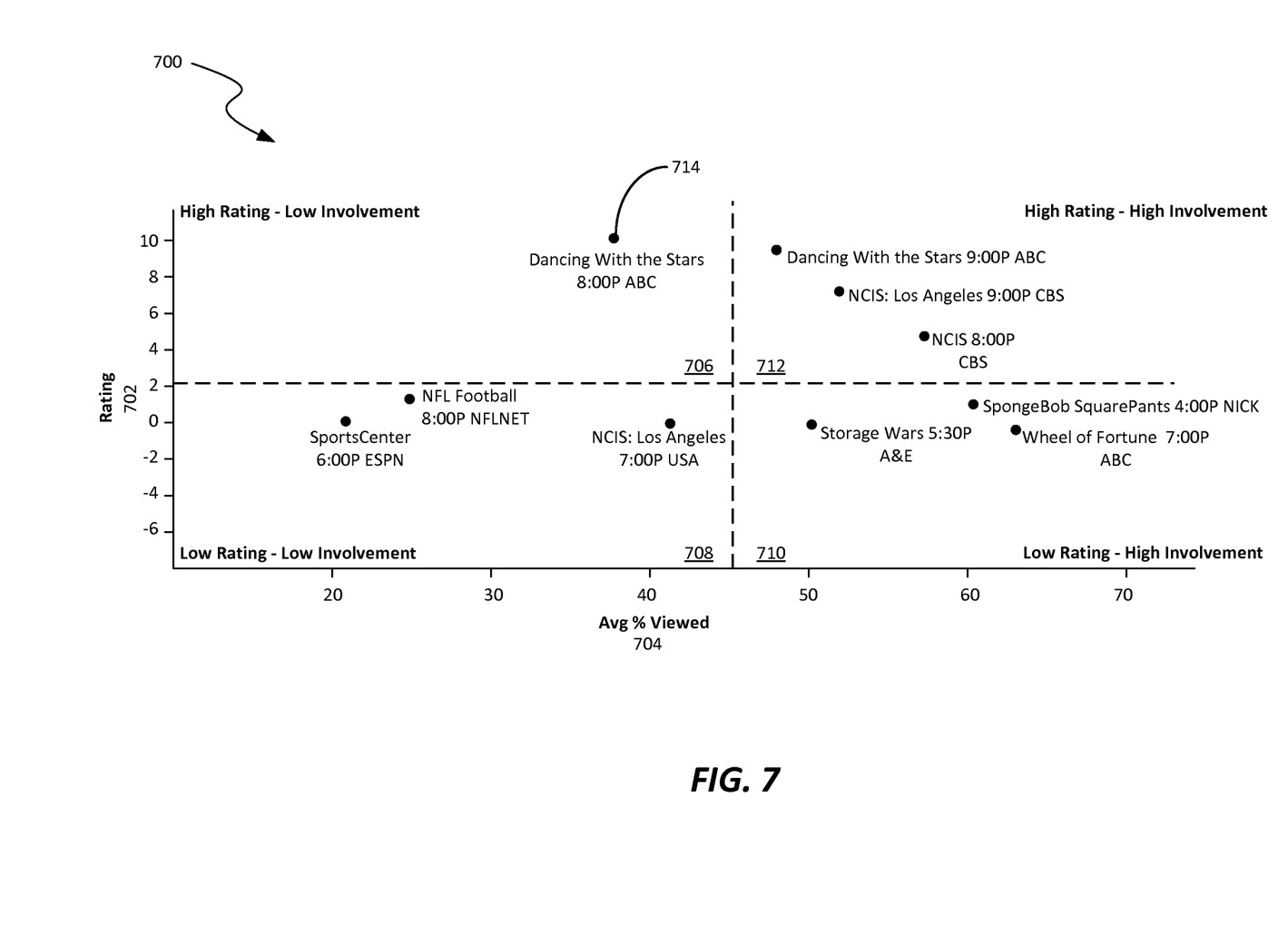
FIG. 7 is a representative chart divided into quadrants of engagement level and rating level used by the system for measuring audience engagement to display viewership for various programs based on average viewership.

Referring now to FIG. 7, a user may elect look at the actual results instead of the indexed results for one or more axes on the chart 700. For example, the user may specify to look at the average percentage (%) of program viewed 704, on the x-axis, and the rating 702, on the y-axis, such as shown in FIG. 7, rather than the stickiness index 604 and rating index 602, such as shown in FIG. 6. As shown in FIG. 7, the plotted data points on chart 700 are positioned similarly to those in FIG. 6, although the measurement differs on the x-axis. This is because the stickiness of each data point is calculated from the viewership, as described in the previous description. In some embodiments, color coding, animation, 3D plots, and other methods of conveying information in a chart may be utilized.

Figure 8:
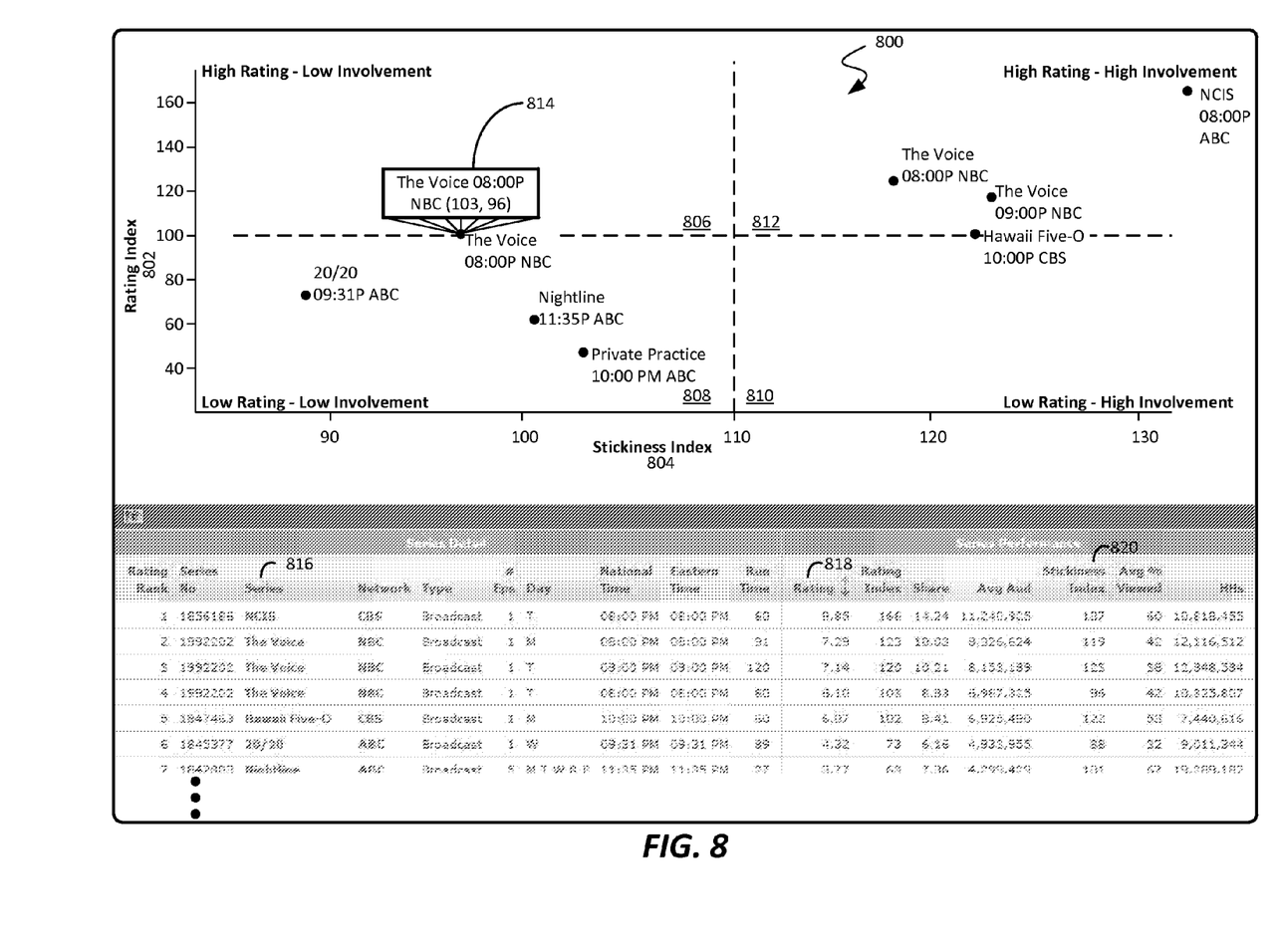
FIG. 8 is an exemplary screenshot of a chart displaying viewership and corresponding summarized viewership data for various programs based on a stickiness index.

FIG. 8 depicts a screenshot of an exemplary interface 800 that is generated by the system and provides various statistical attributes on a per-program basis. As shown in FIG. 8, the interface provide a tabular ranking of each program 816 for which a stickiness index has been calculated. In the depicted example, each line in the table represents a different television series. Various attributes, such as rating 818, share 822, etc., for each series is provided in the table. In addition, the report includes the stickiness index 820 that was calculated by the system using the methodology described herein. Selecting an attribute heading in the table causes the system to sort the rows in the table by the values of the selected attribute. In this fashion, the system allows a user to quickly compare the performance of different series based on the selected attribute.

In addition to the table, the interface 800 also contains a quadrant graph similar to the one depicted in FIG. 7. Each point in the quadrant graph corresponds to a corresponding series listing in the interface table. A system user may select a one of the points to obtain additional information about the selected point. For example, when a user uses a cursor to hover over or otherwise selects the data point associated with the series "The Voice," the system generates a callout box 814 that depicts additional information about the selected series. In one embodiment, the callout box 814 includes additional information regarding the particular broadcast of that show, such as the rating index (96) and the stickiness index (103). In some embodiments, the user can select the callout box 814 for a particular program and the statistical information from the report provided below the chart is highlight or, alternatively, called out to facilitate user viewing of that program's corresponding analyzed data. In other embodiments, the user may select, e.g., click on the callout box 814 and be directed to a full report for that particular program, including graphs and statistical analysis with viewer numbers, etc. The report and the chart can change dynamically and additional tune data is collected from clients and the ratings of each program change. Accordingly, the same analysis may be performed for those programs analyzed in FIG. 8 at a later time and have modified data points and report summaries.

A computing system within which the invention may be implemented in one or more CPUs configurable to access one or more memories or storage devices, which may contain components, such as software, firmware, or hardware components, that implement all or portions of the invention and which may be interconnected by networks, such as the Internet, a private network, a wired network, or a wireless network. Aspects of the system may be implemented by computer readable instructions, which may reside in computer readable storage devices or media such as CDs, DVDs, hard disks, ROM, RAM, other memories, and so on. In some embodiments, portions of the system may reside on customer premises equipment, such as STBs, DVRs, personal computers, and so on. In some embodiments, portions of the system may reside on one or more computer servers (physical or virtual.) In some embodiments, curves may be utilized which represent discrete values rather than continuously changing values, and vice versa.

From the foregoing, it will be appreciated that specific embodiments of the invention have been described herein for purposes of illustration, but that various modifications may be made without deviating from the scope of the invention. Accordingly, the invention is not limited except as by the appended claims.

We claim:

1. A computer implemented method for evaluating audience engagement with broadcast content, the method comprising:
   receiving, on a computing system, tune data from one or more clients, each client associated with a video playback device;
   analyzing the tune data in order to determine viewership data for program content that is viewed by an audience, the program content having a program length and the viewership data including an average percentage of the program content viewed by the audience;
   comparing the viewership data to historical viewership data, the historical viewership data associated with other program content having an equivalent program length; and
   calculating an index based on the historical viewership data, wherein the index reflects an engagement level of the program content relative to other program content.

2. The method of claim 1, wherein the historical viewership data is a regression curve constructed from viewership data for program content having one or more differing program lengths.

3. The method of claim 2, wherein the regression curve is constructed based on daypart, the daypart indicating a specific time frame in which program content is broadcast.

4. The method of claim 2, wherein two or more curves are constructed, each curve representing a particular percentile characterizing the program content.

5. The method of claim 4, wherein the index is determined by interpolating between the two or more curves in order to estimate historical viewership data for the program content.

6. The method of claim 1, wherein the received tune data is associated with broadcast content from one or more delivery platforms.

7. The method of claim 6, further comprising scaling the index for the one or more delivery platforms.

8. The method of claim 1, wherein the historical viewership data is determined for a set of program content, the set of program content sharing one or more attributes.

9. The method of claim 8, wherein the attributes include any one or more of genre, broadcast platform, video playback device, time of day, day of week, length of program, broadcast channel, or network provider.

10. A non-transitory computer-readable medium containing instructions that, when executed by a processor, cause a computing system to implement a method for evaluating audience engagement with broadcast content comprising:
    receiving, on a computing system, tune data from one or more clients, each client associated with a video playback device;
    analyzing the tune data in order to determine viewership data for program content that is viewed by an audience, the program content having a program length and the viewership data including an average percentage of the program content viewed by the audience;
    comparing the viewership data to historical viewership data, the historical viewership data associated with other program content having an equivalent program length; and
    calculating an index based on the historical viewership data, wherein the index reflects an engagement level of the program content relative to other program content.

11. The non-transitory computer-readable medium of claim 10, wherein the historical viewership data is a regression curve constructed from viewership data for program content having one or more differing program lengths.

12. The non-transitory computer-readable medium of claim 11, wherein the regression curve is constructed based on daypart, the daypart indicating a specific time frame in which program content is broadcast.

13. The non-transitory computer-readable medium of claim 11, wherein two or more curves are constructed, each curve representing a particular percentile characterizing the program content.

14. The non-transitory computer-readable medium of claim 13, wherein the index is determined by interpolating between the two or more curves in order to estimate historical viewership data for the program content.

15. The non-transitory computer-readable medium of claim 10, wherein the received tune data is associated with broadcast content from one or more delivery platforms.

16. The non-transitory computer-readable medium of claim 15, further comprising instructions that cause the computing system to scale the index for the one or more delivery platforms.

17. The non-transitory computer-readable medium of claim 10, wherein the historical viewership data is determined for a set of program content, the set of program content sharing one or more attributes.

18. The non-transitory computer-readable medium of claim 17, wherein the attributes include any one or more of genre, broadcast platform, video playback device, time of day, day of week, length of program, broadcast channel, or network provider.

* * * * *